US012656611B2

(12) United States Patent
Cho et al.

(10) Patent No.: US 12,656,611 B2
(45) Date of Patent: Jun. 16, 2026

(54) WEARABLE ELECTRONIC DEVICE ADJUSTING TRANSMITTANCE OF VISOR AND BRIGHTNESS OF DISPLAY

(71) Applicant: SAMSUNG ELECTRONICS CO., LTD., Suwon-si (KR)

(72) Inventors: Sehyun Cho, Suwon-si (KR); Jinchoul Lee, Suwon-si (KR); Jina Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 586 days.

(21) Appl. No.: 18/082,258

(22) Filed: Dec. 15, 2022

(65) Prior Publication Data

US 2023/0122744 A1    Apr. 20, 2023

Related U.S. Application Data

(63) Continuation of application No. PCT/KR2022/012993, filed on Aug. 31, 2022.

(30) Foreign Application Priority Data

Oct. 14, 2021    (KR) ........................ 10-2021-0136498

(51) Int. Cl.
G02B 27/01    (2006.01)
G02B 27/00    (2006.01)
G06V 40/19    (2022.01)

(52) U.S. Cl.
CPC ..... G02B 27/0172 (2013.01); G02B 27/0093 (2013.01); G06V 40/19 (2022.01);
(Continued)

(58) Field of Classification Search
CPC ................ G06F 3/013; G09G 2354/00; G09G 2320/0626; G02B 2027/0118; G02B 27/0172
See application file for complete search history.

(56) References Cited

U.S. PATENT DOCUMENTS 5,993,000 A    11/1999  Kobayashi et al.
9,087,238 B2    7/2015  Choi et al.
(Continued)

FOREIGN PATENT DOCUMENTS

JP        2014-094186        5/2014
JP        2016-170415 A      9/2016
(Continued)

OTHER PUBLICATIONS

PCT International Search Report dated Dec. 9, 2022 for PCT Application No. PCT/KR2022/012993.
(Continued)

*Primary Examiner* — Jonathan Y Jung
(74) *Attorney, Agent, or Firm* — Nixon & Vanderhye P.C.

(57)    ABSTRACT

Provided is a wearable electronic device which may adjust the transmittance of a visor and the intensity of a display. According to various example embodiments, a wearable electronic device may include a visor adjusting the amount of external light entering a user's eyes depending on a transmittance, a display outputting the light projected on the user's eyes through an optical waveguide, a camera capturing an image of the user's eyes, and a processor tracking the user's gaze direction from the image of the user's eyes and supplying a control signal to the visor and the display, wherein the processor may determine the transmittance of the visor and the intensity of light output from the display.

11 Claims, 8 Drawing Sheets

(52) U.S. Cl.
CPC ................ *G02B 2027/0138* (2013.01); *G02B 2027/0178* (2013.01)

(56) References Cited

U.S. PATENT DOCUMENTS

| | | | |
|---|---|---|---|
| 10,874,164 | B1 | 12/2020 | Jarrett et al. |
| 2011/0181541 | A1 | 7/2011 | Kuo |
| 2016/0033772 | A1* | 2/2016 | Han ...................... H04N 1/6083 359/630 |
| 2016/0274365 | A1* | 9/2016 | Bailey ...................... G09G 3/02 |
| 2017/0178375 | A1* | 6/2017 | Benishti ............. G02B 27/0172 |
| 2018/0314066 | A1 | 11/2018 | Bell et al. |
| 2020/0074724 | A1 | 3/2020 | Mathur et al. |
| 2021/0038072 | A1* | 2/2021 | Gustafsson ............ A61B 3/113 |
| 2021/0133440 | A1* | 5/2021 | Silverstein .............. G06F 3/013 |

FOREIGN PATENT DOCUMENTS

| | | |
|---|---|---|
| JP | 2017-097098 | 6/2017 |
| KR | 10-2006-0057405 A | 5/2006 |
| KR | 10-2014-0066258 A | 5/2014 |
| KR | 10-2015-0122952 A | 11/2015 |
| KR | 10-2016-0091114 | 8/2016 |
| KR | 10-2017-0044706 A | 4/2017 |
| WO | WO 2021/030770 A1 | 2/2021 |

OTHER PUBLICATIONS

Extended European Search Report dated Oct. 15, 2024 for EP Application No. 22881202.0.
An Accurate and Efficient User Authentication Mechanism on Smart Glasses Based on Iris Recognition (XP093209711) 27 pages; vol. 2017, Jan. 1, 2017; Mobile Information Systems.
Korean Office Action dated May 7, 2026 for KR Application No. 10-2021-0136498.

\* cited by examiner

WEARABLE ELECTRONIC DEVICE ADJUSTING TRANSMITTANCE OF VISOR AND BRIGHTNESS OF DISPLAY

CROSS-REFERENCE TO RELATED APPLICATIONS

This application is a continuation of International Application No. PCT/KR2022/012993, designating the United States, filed on Aug. 31, 2022, in the Korean Intellectual Property Receiving Office and claiming priority to Korean Patent Application No. 10-2021-0136498, filed on Oct. 14, 2021, in the Korean Intellectual Property Office, the disclosures of which are incorporated by reference herein in their entireties.

BACKGROUND

1. Field

The disclosure relates to a wearable electronic device for controlling the transmittance of a visor and/or the brightness of a display.

2. Description of Related Art

Recently with the growth of electronic devices such as smartphones and tablet personal computers (PCs), electronic devices enabling wireless voice calls and information exchange have become necessities. Electronic devices were initially considered just portable devices for wireless calls. However, with the development of technology and the introduction of the wireless Internet, electronic devices serve as not just portable devices for wireless calls but as multimedia devices with various functions such as scheduling, gaming, remote control, and image capturing.

In particular, an electronic device with an augmented reality (AR) service has been introduced on the market. The AR service may superimpose a virtual image of supplementary information on a real-world image seen by a user and provide the user with a virtual image including content related to a real object identified from the real-world image.

SUMMARY

Example embodiments of the present disclosure may provide an electronic device which uses the physical phenomenon in which the size of the pupil or the iris varies according to the brightness of the light entering a user's eyes, to control the transmittance of a visor and the intensity of the light output from a display, thereby decreasing the misrecognition rate during iris recognition and gaze tracking.

According to various example embodiments disclosed herein, an electronic device may control the transmittance of a visor and the intensity of the light output from a display according to the brightness of external light.

According to various example embodiments, a wearable electronic device may include a visor that adjusts the amount of the external light entering a user's eyes according to a transmittance, a display that outputs the light projected on the user's eyes through an optical waveguide, a camera that captures an image of the user's eyes and a processor that tracks a gaze direction of the user from the eye image, wherein the processor may determine the transmittance of the visor and the intensity of the light output from the display based on at least the size of the pupil region identified from the image, and the visor may include an electrochromic element configured to change color under applied power to adjust the transmittance.

A wearable electronic device according to various example embodiments may include a visor that adjusts the amount of the external light entering a user's eyes according to a transmittance, a display that outputs the light projected on the user's eyes through an optical waveguide, a camera that captures an image of the user's eyes and a processor that recognizes the user's iris from the captured image and provides a control signal to the visor and the display, wherein the processor may determine the transmittance of the visor and the intensity of the light output from the display based on the size of the iris region identified from the eye image, and the visor may include an electrochromic element that changes color under applied power to adjust the transmittance.

A wearable electronic device according to various example embodiments may include a visor that adjusts the amount of the external light entering a user's eyes according to a transmittance, a display that outputs the light projected on the user's eyes through an optical waveguide, a camera that captures an image of the user's eyes and a processor that provides a control signal to the visor and the display, wherein the processor may select an iris recognition mode or a gaze tracking mode according to an object to be identified from the eye image, and the visor may include an electrochromic element that changes color under applied power to adjust the transmittance.

According to various example embodiments disclosed herein, provided is an electronic device which uses the physical phenomenon in which the size of the pupil or the iris varies due to the brightness of the light entering a user's eyes, to control the transmittance of a visor and the intensity of the light output from a display, thereby decreasing the misrecognition rate during iris recognition and gaze tracking.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
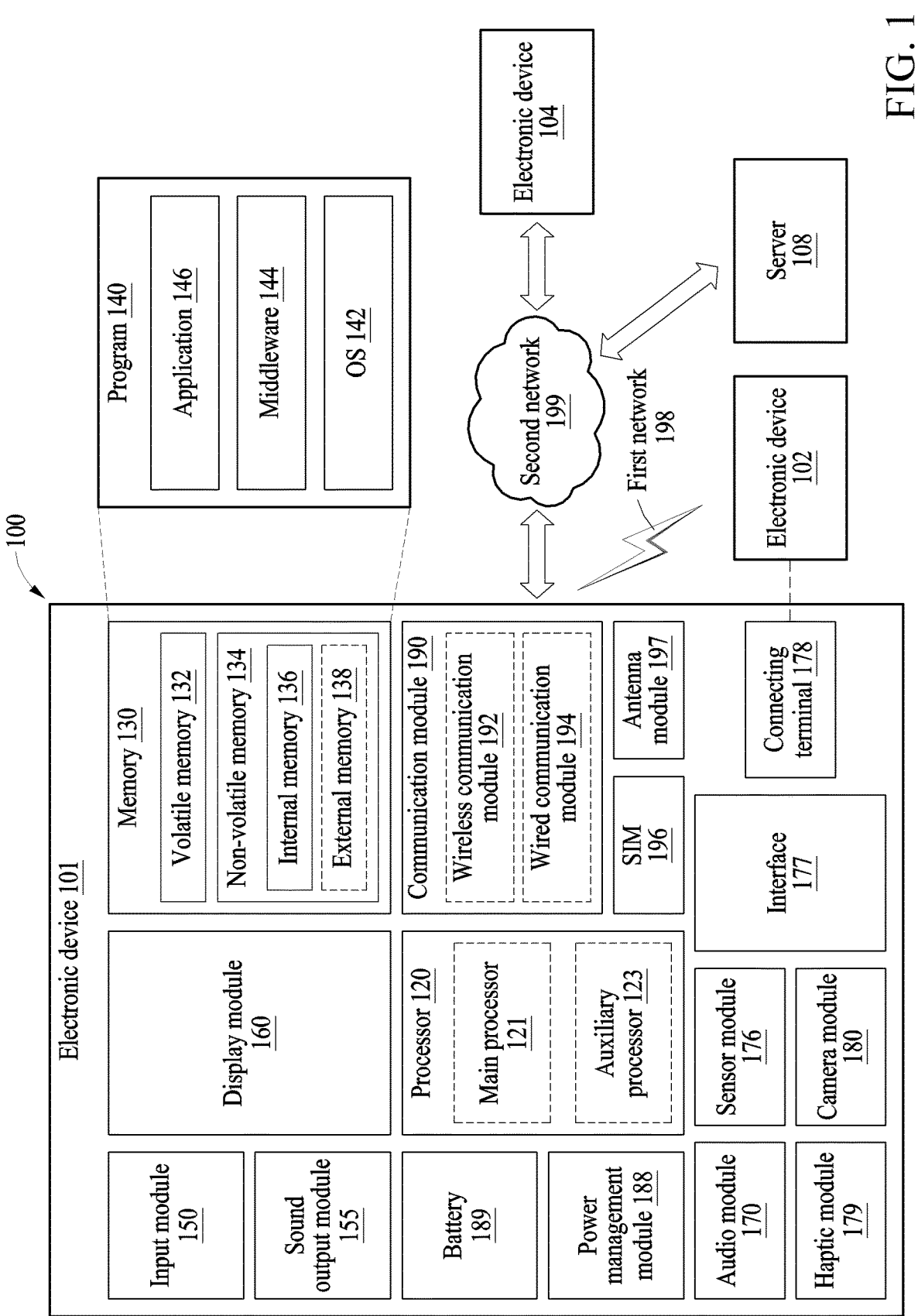
FIG. 1 is a block diagram of an electronic device in a network environment according to an example embodiment.

Hereinafter, example embodiments will be described in detail with reference to the accompanying drawings. When describing the example embodiments with reference to the accompanying drawings, like reference numerals refer to like constituent elements and a repeated description related thereto will be omitted.

FIG. 1 is a block diagram of an electronic device in a network environment according to an example embodiment.

Referring to FIG. 1, the electronic device 101 in the network environment 100 may communicate with an electronic device 102 via a first network 198 (e.g., a short-range wireless communication network), or communicate with an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some example embodiments, at least one of the components (e.g., the connecting terminal 178) may be omitted from the electronic device 101, or one or more other components may be added to the electronic device 101. In some example embodiments, some of the components (e.g., the sensor module 176, the camera module 180, or the antenna module 197) may be integrated as a single component (e.g., the display module 160). Each "module" herein may include circuitry.

The processor 120 may execute, for example, software (e.g., a program 140) to control at least one other component (e.g., a hardware or software component) of the electronic device 101 connected to the processor 120 and may perform various data processing or computations. According to an example embodiment, as at least a part of data processing or computation, the processor 120 may store a command or data received from another component (e.g., the sensor module 176 including at least one sensor, or the communication module 190 including communication circuitry) in a volatile memory 132, process the command or the data stored in the volatile memory 132, and store resulting data in a non-volatile memory 134 (e.g., which may include internal memory 136 and/or external memory 138). According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjoint with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a control circuit for controlling a display, a hologram device, or a projector and control circuitry to control a corresponding one of the display, the hologram device, and the projector. According to an example embodiment, the display device 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local region network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide region network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
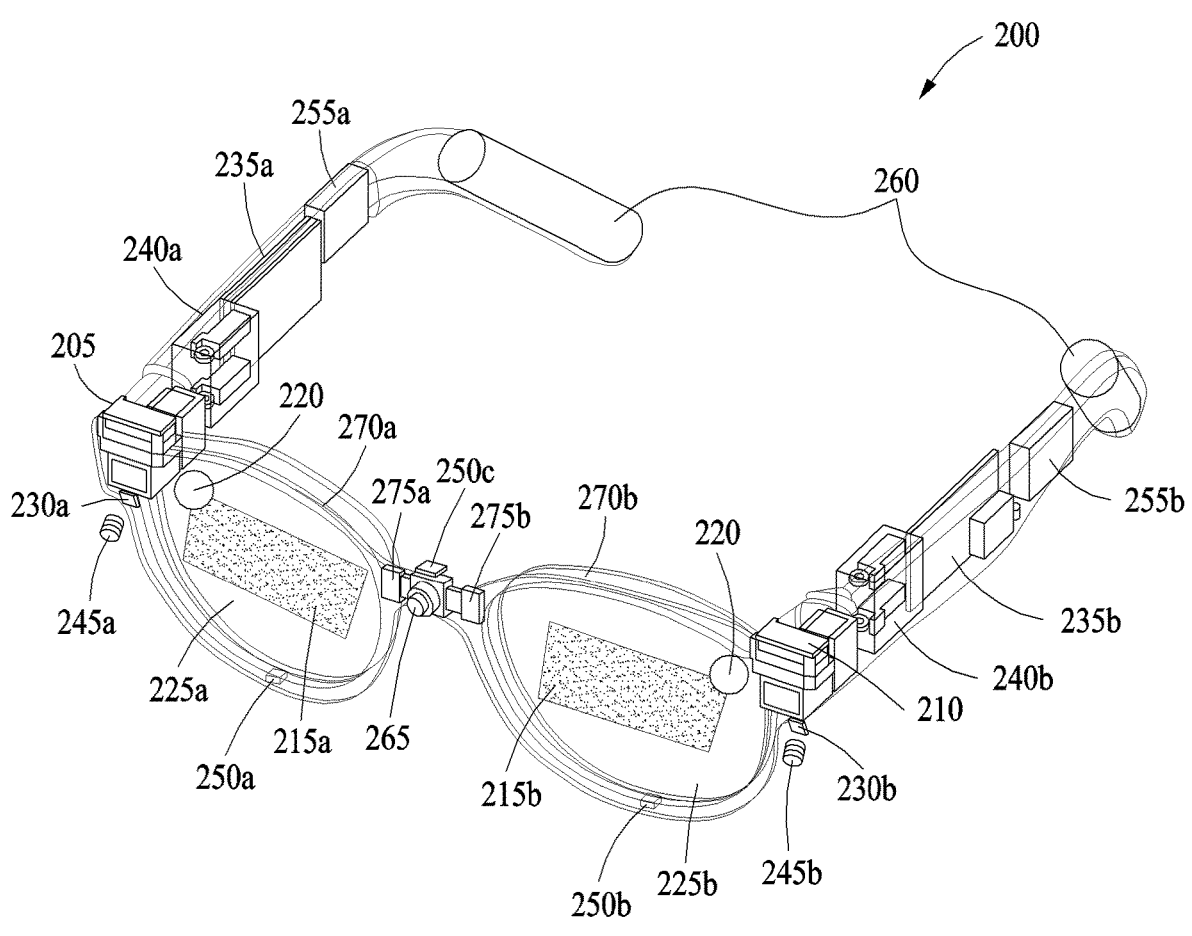
FIG. 2 is a diagram illustrating a structure of a wearable electronic device according to an example embodiment.

FIG. 2 is a diagram illustrating the structure of a wearable electronic device according to an example embodiment. Each embodiment herein may be used in combination with any other embodiment(s) herein.

Referring to FIG. 2, a wearable electronic device 200 (e.g., the electronic device 101 in FIG. 1) may be worn on a user's face to provide the user with an image associated with an augmented reality (AR) service and/or a virtual reality (VR) service.

In an example embodiment, the wearable electronic device 200 may include a first display 205, a second display 210, a screen display portion 215 (e.g., see screen display portions 215a and 215b), an input optical member 220, a first transparent member 225a, a second transparent member 225b, lighting units 230a and 230b, a first PCB 235a, a second PCB 235b, a first hinge 240a, a second hinge 240b, first cameras 245a and 245b, a plurality of microphones (e.g., a first microphone 250a, a second microphone 250b, and a third microphone 250c), a plurality of speakers (e.g., a first speaker 255a, and a second speaker 255b), a battery 260, second cameras 275a and 275b, a third camera 265, and visors 270a and 270b.

In an example embodiment, a display (e.g., the first display 205 and the second display 210) may include, for example, a liquid crystal display (LCD), a digital mirror device (DMD), a liquid crystal on silicon (LCoS), an organic light-emitting diode (OLED), a micro light-emitting diode (micro-LED), or the like. Although not shown, when the display is one of an LCD, a DMD, and an LCoS, the wearable electronic device 200 may include a light source configured to emit light to a screen output area of the display. In an example embodiment, when the display is capable of generating light by itself, for example, when the display is either an OLED or a micro-LED, the wearable electronic device 200 may provide a virtual image with a relatively high quality to the user even though a separate light source is not included. For example, when the display is implemented as an OLED or a micro-LED, a light source may be unnecessary, which may decrease the weight of the wearable electronic device 200. Hereinafter, a display capable of generating light by itself may be referred to as a "self-luminous display", and a description will be made on the assumption of the self-luminous display.

A display (e.g., the first display 205 and the second display 210) according to various example embodiments may include at least one micro-LED. For example, the micro-LED may emit red (R), green (G), and blue (B) by itself, and a single chip may implement a single pixel (e.g., one of R, G, and B pixels) because the micro-LED is relatively small in size (e.g., 100 μm or less). Accordingly, the display may provide a high resolution without a back-light unit (BLU), when the display is composed of a micro-LED.

However, the example embodiments are not limited thereto. A pixel may include R, G and B, and a single chip may be implemented by a plurality of pixels including R, G, and B pixels.

In one example embodiment, the display (e.g., the first display 205 and the second display 210) may be composed of a display area made up of pixels for displaying a virtual image, and light receiving pixels (e.g., photo sensor pixels) disposed among pixels that receive the light reflected from eyes and convert the reflected light into electrical energy to output.

In an example embodiment, the wearable electronic device 200 (e.g., the processor 120 in FIG. 1) may detect a gaze direction (e.g., a movement of the pupil) of the user through the light receiving pixels. For example, the wearable electronic device 200 may detect and track a gaze direction of a right eye of the user and a gaze direction of a left eye of the user through one or more light receiving pixels of the first display 205 and one or more light receiving pixels of the second display 210. The wearable electronic device 200 may determine a central position of a virtual image according to the gaze directions (e.g., directions in which pupils of the right eye and the left eye of the user gaze).

In an example embodiment, the light emitted from the display (e.g., the first display 205 and the second display 210) may reach the screen display portion 215 formed on the first transparent member 225a that faces the right eye of the user, and the screen display portion 215 formed on the second transparent member 225b that faces the left eye of the user, by passing through a lens (not shown) and a waveguide. For example, the light emitted from the display (e.g., the first display 205 and the second display 210) may be reflected from a grating area formed on the input optical member 220 and the screen display portion 215 to be delivered to the user's eyes, by passing through a waveguide. The first transparent member 225a and/or the second transparent member 225b may be formed as, for example, a glass plate, a plastic plate, or a polymer, and may be transparently or translucently formed.

In an example embodiment, a lens (not shown) may be disposed on a front surface of the display (e.g., the first display 205 and the second display 210). The lens (not shown) may include a concave lens and/or a convex lens. For example, the lens (not shown) may include a projection lens or a collimation lens.

In an example embodiment, the screen display portion 215 (e.g., see screen display portions 215a and 215b) or the transparent member (e.g., the first transparent member 225a and the second transparent member 225b) may include a lens including a waveguide and a reflective lens.

In an example embodiment, the waveguide may be formed of glass, plastic, or a polymer, and may have a nanopattern formed on one surface of the inside or outside, for example, a grating structure of a polygonal or curved shape. According to an example embodiment, the light incident on one end of the waveguide may be spread inside a display waveguide by the nanopattern to be provided to the user. For example, the waveguide including a freeform prism may provide incident light to the user through a reflection mirror. The waveguide may include at least one of diffractive elements (e.g., a diffractive optical element (DOE) or a holographic optical element (HOE) or at least one of a reflective elements (e.g., a reflection mirror). In an example embodiment, the waveguide may guide light emitted from the first display 205 and the second display 210 to the eyes of the user, using at least one diffractive element or a reflective element included in the waveguide.

According to various example embodiments, the diffractive element may include the input optical member 220 and/or an output optical member (not shown). For example, the input optical member 220 may refer to an input grating area, and the output optical member (not shown) may refer to an output grating area. The input grating area may play a role as an input terminal which diffracts (or reflects) the light output from the display (e.g., the first display 205 and the second display 210) (e.g., a micro-LED) to transmit the light to transparent members 225a and/or 225b of the screen display portion 215. The output grating region may serve as an exit for diffracting (or reflecting), to the user's eyes, the light transmitted to the transparent members (e.g., the first transparent member 225a and/or the second transparent member 225b) of the waveguide.

According to various example embodiments, the reflective element may include a total reflection optical element or a total reflection waveguide for total internal reflection (TIR). For example, total reflection may be a scheme of inducing light and refer to generating an angle of incidence so that light (e.g., a virtual image) input through an input grating area is 100% reflected from one surface (e.g., a specific surface) of the waveguide, to transmit 100% of the light to an output grating area.

In an example embodiment, the light emitted from the displays 205 and 210 may be guided by the waveguide through the input optical member 220. Light traveling in the waveguide may be guided toward the eyes of the user through the output optical member. The screen display portion 215 may be determined based on the light emitted toward the user's eyes.

In an example embodiment, the first cameras 245a and 245b may include a camera used for three degrees of freedom (3DoF), head tracking of 6DoF, hand detection and tracking, gestures and/or space recognition. For example, the first cameras 245a and 245b may include a GS camera to detect a movement of a head or a hand and track the movement.

For example, a stereo camera may be applied to the first cameras 245a and 245b for head tracking and space recognition, and a camera with the same standard and performance may be applied. A GS camera having excellent performance (e.g., image dragging) may be used for the first cameras 245a and 245b to detect a minute movement such as a quick movement of a hand or a finger and to track the movement.

According to various example embodiments, a rolling shutter (RS) camera may be used for the first cameras 245a and 245b that may perform a SLAM function through space recognition and depth capturing for 6 Dof and may fulfill a user gesture recognition function.

In an embodiment, the second cameras 275a and 275b may be used for the detection and tracking of the pupil. The second cameras 275a and 275b may be referred to as a camera or cameras for eye tracking (ET). The second camera 275a and 275b may track a gaze direction of the user. In consideration of a gaze direction of the user, the electronic device 200 may position a center of a virtual image projected on the screen display portion 215 according to a gaze direction of the user.

A GS camera may be used for the second cameras 275a and 275b to detect the pupil and track a quick pupil movement. The second camera 275a may be installed for a left eye or a right eye, and a camera having the same performance and standard may be used for the other second camera 275b for the left eye and the right eye.

In an example embodiment, the second cameras 275a and 275b may include a gaze tracking sensor. For example, the wearable electronic device 200 may further include a lighting unit, and the gaze tracking sensor may detect reflected light of the infrared light incident on the user's eyes from the lighting unit. For example, the gaze tracking sensor may track, using the reflected light, the gaze direction of the user (e.g., see gaze tracking step 613 in FIG. 6).

In an example embodiment, the third camera 265 may be referred to as "high resolution (HR)" or a "photo video (PV)" and may include a high-resolution camera. The third camera 265 may include a color camera having functions for obtaining a high-quality image, such as an automatic focus (AF) and an optical image stabilizer (OIS). The example embodiments are not limited thereto, and the third camera 265 may include a global shutter (GS) camera or a rolling shutter (RS) camera.

In an example embodiment, at least one sensor (e.g., a gyro sensor, an acceleration sensor, a geomagnetic sensor, a touch sensor, an illuminance sensor and/or a gesture sensor) and the first cameras 245a and 245b may perform at least one of the functions among head tracking for 6DoF, pose estimation and prediction, gesture and/or space recognition, and a simultaneous localization and mapping (SLAM) through depth imaging.

In another embodiment, the first cameras 245a and 245b may be classified and separately used as a camera for head tracking or a camera for hand tracking.

In an example embodiment, the lighting units 230a and 230b may be used differently according to positions in which the light units 230a and 230b are attached. For example, the lighting units 230a and 230b may be attached together with the first cameras 245a and 245b mounted around a hinge (e.g., the first hinge 240a and the second hinge 240*b* that connects a frame and a temple or around a bridge that connects frames). When a GS camera captures an image, the lighting units 230*a* and 230*b* may be used to supplement a surrounding brightness. For example, the lighting units 230*a* and 230*b* may be used in a dark environment or when it is not easy to detect a subject to be captured due to reflected light and mixing of various light sources.

In an example embodiment, the lighting units 230*a* and 230*b* attached to the periphery of the frame of the electronic device 200 may be an auxiliary means for facilitating an eye gaze detection when the second cameras 275*a* and 275*b* capture pupils. When the lighting units 230*a* and 230*b* are used as an auxiliary means for detecting a gaze direction, an infrared (IR) LED of an infrared wavelength may be included.

In an embodiment, components (e.g., the processor and the memory in the figures such as FIG. 1 and/or FIG. 3) of the wearable electronic device 200 may be disposed in a PCB (e.g., the first PCB 235*a* and/or the second PCB 235*b*). The PCB may transmit electrical signals to the components of the wearable electronic device 200.

In an example embodiment, a plurality of microphones (e.g., the first microphone 250*a*, the second microphone 250*b*, and the third microphone 250*c*) may convert an external acoustic signal into electrical audio data. The electrical audio data may be variously utilized depending on a function (or an application being executed) being performed by the wearable electronic device 200.

In an example embodiment, a plurality of speakers (e.g., the first speaker 255*a* and the second speaker 255*b*) may output audio data that is received from a communication circuit (e.g., a communication circuit of the communication module 190 in FIG. 1) and/or stored in a memory (e.g., the memory 130 in FIG. 1).

In an example embodiment, one or more batteries 260 may be included, and may supply power to the components of the wearable electronic device 200.

In an embodiment, the visors 270*a* and 270*b* may adjust the amount of external light incident on the user's eyes according to a transmittance. The visors 270*a* and 270*b* may be positioned in front or behind the screen display portion 215. The front side of screen display portion 215 may refer to a direction opposite to the user wearing the electronic device 200, and the rear side may refer to a direction of the user wearing the electronic device 200. The visors 270*a* and 270*b* may protect the screen display portion 215 and adjust the amount of external light transmitted.

For example, the visors 270*a* and 270*b* may include an electrochromic element that changes color depending on applied power to adjust the transmittance. Electrochromism is a phenomenon in which an applied power triggers an oxidation-reduction reaction to change color. The visors 270*a* and 270*b* may adjust the amount of the external light entering the user's eyes by using the color change of the electrochromic element.

For example, the visors 270*a* and 270*b* may include a control module and an electrochromic element. The control module, including control circuitry, may control the electrochromic element to adjust the transmittance of the electrochromic element.

Figure 3:
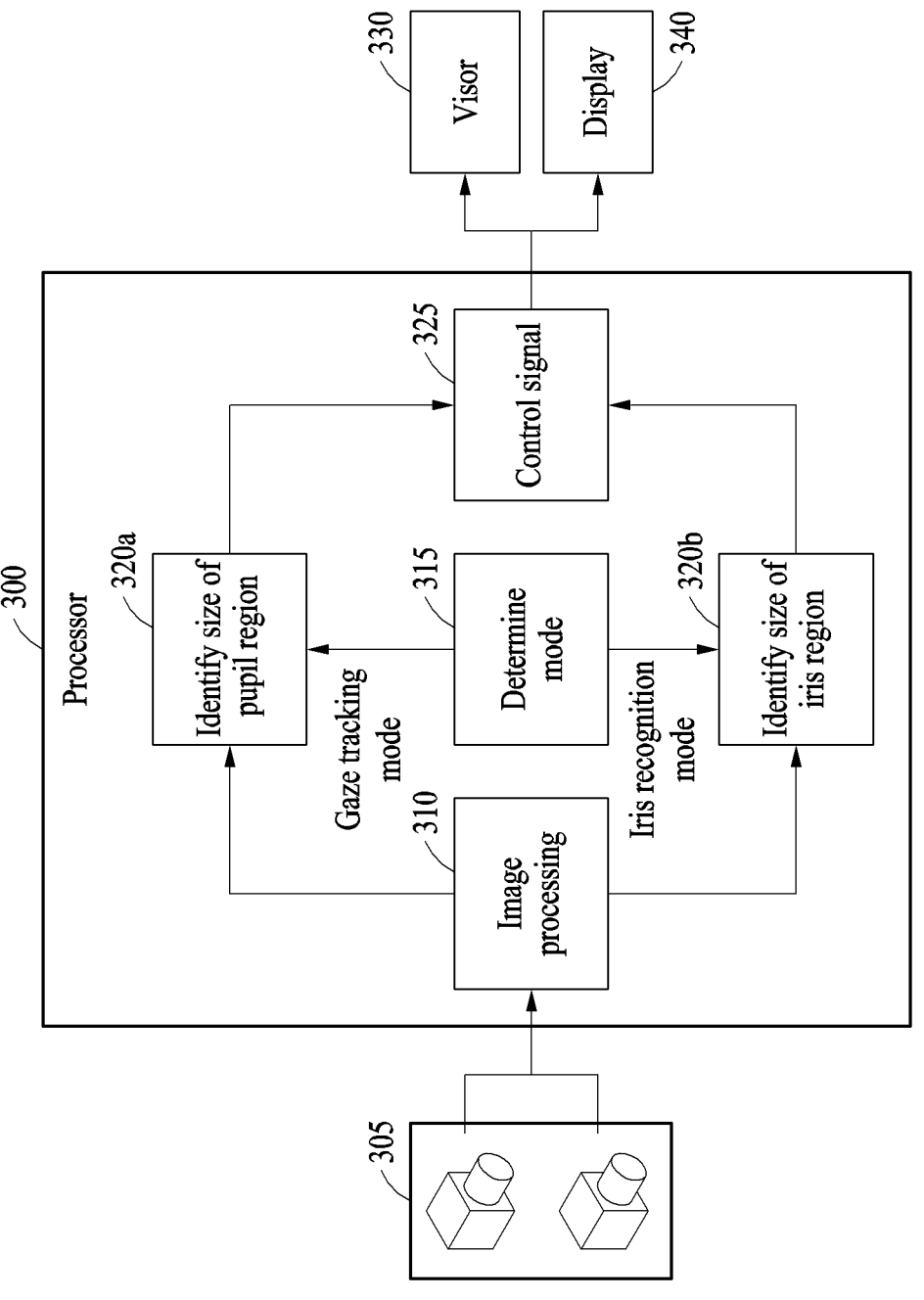
FIG. 3 is a diagram illustrating the operation of a processor of a wearable electronic device according to an example embodiment.

FIG. 3 is a diagram illustrating the operation of a processor, including processing circuitry, of a wearable electronic device according to an example embodiment.

According to an embodiment, a wearable electronic device (e.g., the electronic device 101 in FIG. 1 and the wearable electronic device 200 in FIG. 2) may include a processor 300 (e.g., the processor 120 in FIG. 1) and a camera 305 (e.g., first cameras 245*a* and 245*b*, second cameras 275*a* and 275*b* and a third camera 265), a visor 330 (e.g., visors 270*a* and 270*b* in FIG. 2) and a display 340 (e.g., the first display 205 and the second display 210 in FIG. 2). The wearable electronic device may determine the transmittance of the visor 330 and the intensity of the light output from the display 340. The intensity of the light output from the display 340 may be understood to be the same as the brightness of the display 340.

The camera 305 may acquire an image of a user's eyes. The processor 300, including processing circuitry, may process the eye image in operation 310. The processor 300 may distinguish the pupil region and the iris region of the eye image.

The processor 300 may determine the mode of operation 315. The mode may be determined based on the target identified by the processor 300. For example, the target identified by the processor 300 from the eye image may be the pupil or a gaze direction.

When the identified target is the gaze direction, the processor 300 may select a gaze tracking mode. In the gaze tracking mode, the processor 300 may identify the size of the pupil region of the eye image in operation 320*a*.

When the identified target is the iris, the processor 300 may select an iris recognition mode. In the iris recognition mode, the processor 300 may identify the size of an iris region in operation 320*b*.

The size of the pupil or iris region may refer to the area and the width of the pupil or the iris. The size of the pupil may refer to the diameter or the radius of the pupil.

The processor 300 may output a control signal according to the size of the pupil or iris region identified in operation 325. The processor 300 may supply an output control signal to the visor 330 and the display 340. The control signal may be supplied each to the visor 330 and the display 340 to determine the transmittance of the visor 330 and the intensity of the light output from the display 340.

As another example, when the user's gaze direction may not be tracked or the user's iris may not be recognized in operation 325, the processor 300 may output a control signal.

For example, when the user's gaze direction may not be tracked, the processor 300 may output a control signal which lowers the transmittance of the visor 330 and the intensity of the light output from the display 340, to induce a response of enlarging a size of the user's pupil.

As another example, when the use's iris may not be recognized, the processor 300 may output a control signal which raises the transmittance of the visor 330 and the intensity of the light output from the display 340, to induce a response of enlarging the size of the user's iris.

The processor 300 may supply a control signal to the visor 330 and the display 340 to control the transmittance of the visor 330 and the intensity of the light output from the display 340. The intensity of the light incident on the user's eyes may be controlled depending on the transmittance of the visor 330 and the intensity of the light output from the display 340.

The user's pupil or iris region may expand or contract depending on the intensity of the light incident on the human eyes. For example, a high intensity of the light incident on the eyes may contract the user's pupil region but conversely enlarge the user's iris area. A low intensity of the light incident on the eyes may enlarge the user's pupil region but conversely contract the user's iris area. By controlling the transmittance of the visor 330 and the intensity of the light output from the display 340, the processor 300 may induce a body change such as a change in a pupil or iris region depending on the intensity of the light incident on the user's eyes.

The processor 300 may track the user's gaze direction from an image of the user's eyes. The processor 300 may track a user's gaze direction from a pupil region in the eye image.

The processor 300 may recognize the user's iris from the eye image. The processor 300 may recognize an iris region in the eye image, and may recognize the user's iris from an iris region in the eye image.

For example, the processor 300 may output, under the user's gaze direction, the light that is output from the display 340 and incident on the user's eyes through an optical waveguide (or waveguide). The processor 300 may perform user authentication using a pre-registered user's iris and a recognized one.

Figure 4:
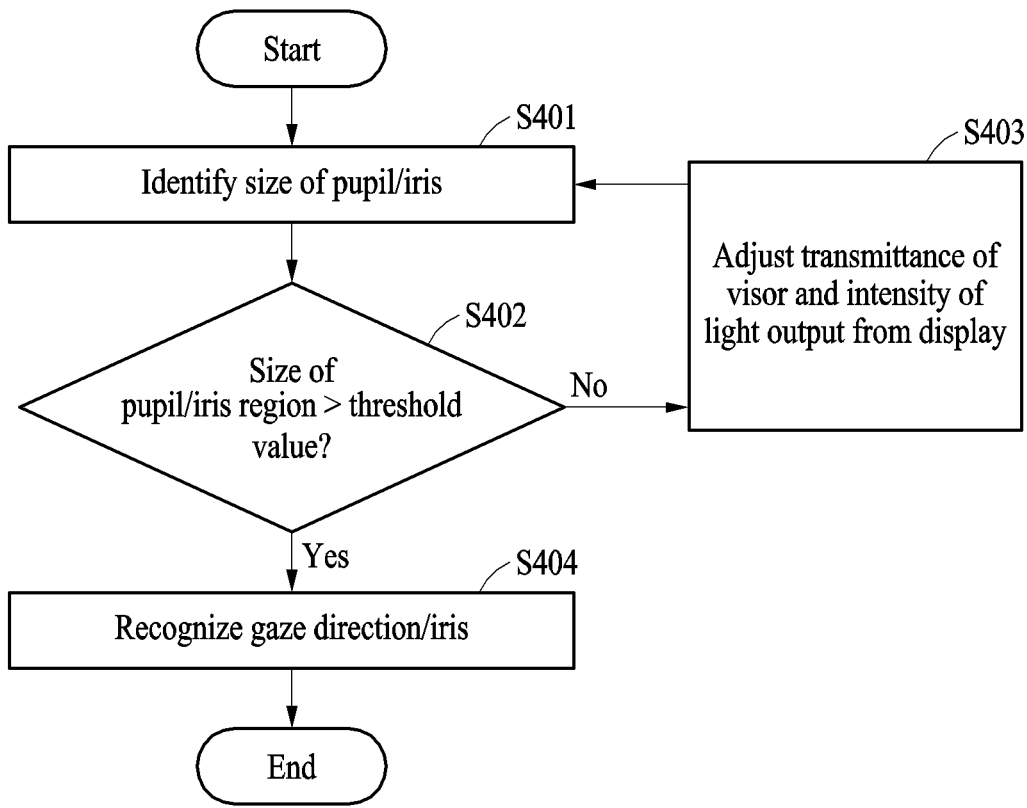
FIG. 4 illustrates a flowchart illustrating the operation of a wearable electronic device according to an example embodiment.

FIG. 4 illustrates a flowchart illustrating the operation of a wearable electronic device according to an example embodiment.

Referring to FIG. 4, a wearable electronic device (e.g., the electronic device 101 in FIG. 1 and the wearable electronic device 200 in FIG. 2) acquires an image of the user's eyes in operation S401, and the size of a pupil or the iris region of the eye image may be identified. The wearable electronic device may acquire the user's eye image, using a camera (e.g., the second cameras 275a and 275b in FIG. 2 and the camera 305 in FIG. 3).

In operation S402, the wearable electronic device may determine whether the size of a pupil or an iris region exceeds a preset size threshold. For example, threshold values for a pupil and an iris size may be set differently.

When the size of a pupil or an iris region is equal to or less than a threshold value in operation S402, the wearable electronic device may adjust the transmittance of a visor (e.g., the visors 270a and 270b in FIG. 2) and the intensity of the light output from a display (e.g., the displays 205 and 210 in FIG. 2 and the display 340 in FIG. 3).

For example, when the size of a pupil region is less than or equal to a threshold value in operation S402, the wearable electronic device may reduce the transmittance of the visor and the intensity of the light output from the display in operation S403. The wearable electronic device may reduce the intensity of the light incident on the user's eyes to induce a body change of enlarging the user's pupil.

For example, when the size of an iris region is equal to or less than a threshold value in operation S402, the wearable electronic device may increase the transmittance of the visor and the intensity of the light output from the display in operation S403. The wearable electronic device may increase the intensity of the light incident on the user's eyes to induce a body change of enlarging the user's iris region.

When the size of a pupil or an iris region exceeds a threshold value in operation S402, the wearable electronic device may use an image of the user's eyes to track the user's gaze direction or recognize the user's iris in operation S404.

Figures 5A, 5B:
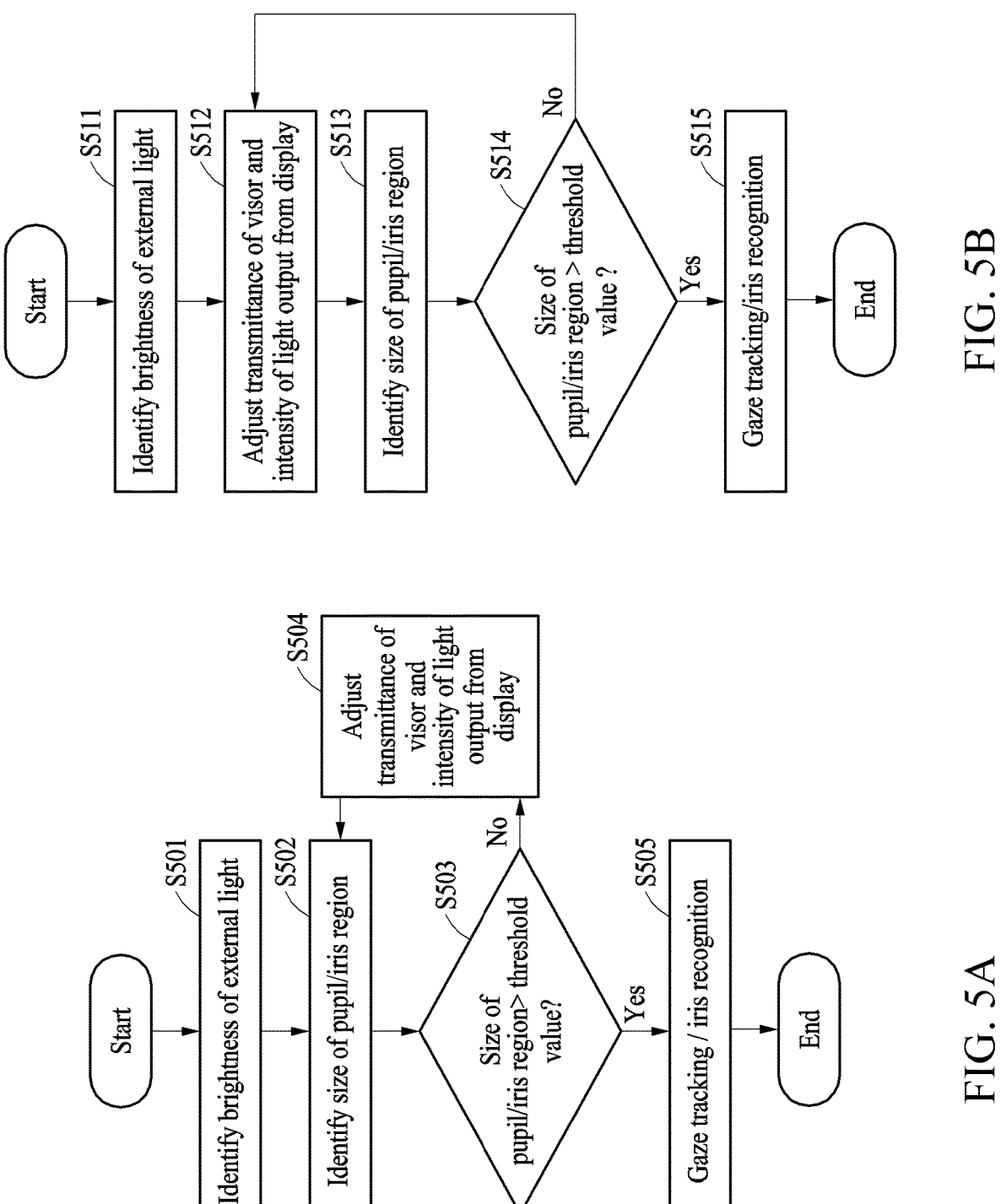
FIGS. 5A-5B are flowcharts illustrating the operation of a wearable electronic device including an illuminance sensor according to an example embodiment(s).

FIGS. 5A and 5B are flowcharts illustrating the operation of a wearable electronic device including an illuminance sensor according to an exemplary embodiment.

A wearable electronic device (e.g., the electronic device 101 in FIG. 1 and the wearable electronic device 200 in FIG. 2) according to an example embodiment may include an illuminance sensor that measures the brightness of external light. The wearable electronic device may determine the transmittance of a visor (e.g., the visors 270a and 270b in FIG. 2 and the visor 330 in FIG. 3) and the intensity of the light output from a display (e.g., the displays 205 and 210 in FIG. 2 and the display 340 in FIG. 3) according to the brightness of external light.

FIG. 5(A) is a flowchart illustrating the operation of the wearable electronic device including an illuminance sensor according to an exemplary embodiment. In operation S501, the wearable electronic device may identify the brightness of the external light measured by the illuminance sensor.

In operation S502, the wearable electronic device may identify (e.g., a size of) a pupil or an iris region from an image of the user's eyes captured by a camera (e.g., the second camera 275a or 275b in FIG. 2 and the camera 305 in FIG. 3).

In operation S503, the wearable electronic device may determine whether the size of a pupil or an iris region exceeds a preset size threshold.

When the size of a pupil or an iris region is equal to or less than a threshold value in operation S503, the wearable electronic device may adjust the transmittance of the visor and the intensity of the light output from the display in operation S504.

For example, when the size of a pupil region is equal to or less than a threshold value in operation S503, the wearable electronic device may reduce the transmittance of the visor and the intensity of the light output from the display in operation S504. The wearable electronic device may reduce the intensity of the light incident on the user's eyes to induce a body change of enlarging the user's pupil.

In operation S504, the wearable electronic device that tracks a gaze direction of the user may determine the transmittance of the visor and the intensity of the light output from the display according to the brightness of external light. For example, when the brightness of external light exceeds a preset brightness, the wearable electronic device may determine the transmittance of the visor and the intensity of the light output from the display to be lower than those when the brightness of external light is less than or equal to a preset brightness.

For example, when the size of an iris region is equal to or less than a threshold value in operation S503, the wearable electronic device may increase the transmittance of the visor and the intensity of the light output from the display in operation S504. The wearable electronic device may increase the intensity of the light reaching the user's eyes to induce a body change of enlarging the user's iris region.

In operation S504, the wearable electronic device recognizing the user's iris may determine the transmittance of the visor and the intensity of the light output from the display according to the brightness of external light. For example, when the brightness of external light exceeds a preset brightness, the wearable electronic device may determine the transmittance of the visor and the intensity of the light output from the display to be higher than those when the brightness of the external light is less than or equal to a preset brightness.

For example, in operation S504, the wearable electronic device recognizing the user's iris may determine the transmittance of the visor when the brightness of external light is equal to or greater than a preset brightness. When the brightness of external light is equal to or greater than a preset brightness, the wearable electronic device may cause the display to output light under an existing setting without adjusting the intensity of the light output from the display.

When the brightness of the external light is equal to or greater than a preset brightness, the wearable electronic device may adjust the transmittance of the visor to project light sufficiently onto the user's iris. The wearable electronic device recognizing the user's iris may adjust the transmittance of the visor to induce a body response of making a size of the user's iris greater than or equal to a threshold value.

When the size of a pupil or an iris region exceeds a threshold value in operation S503, the wearable electronic device may use the user's eye image to track the user's gaze direction or recognize the user's iris in operation S505.

FIG. 5 (B) is a flowchart illustrating the operation of the wearable electronic device including an illuminance sensor according to an exemplary embodiment.

Referring to FIG. 5. (B), the wearable electronic device may identify the brightness of external light measured by the illuminance sensor in operation S511.

In operation S512, the wearable electronic device may adjust the transmittance of the visor and the intensity of the light output from the display according to the brightness of external light. As described in operation S504, the wearable electronic device may adjust the transmittance of the visor and the intensity of the light output from the display according to the brightness of external light and an identified target.

For example, the wearable electronic device recognizing the user's iris may adjust the transmittance of the visor in operation S512 when the brightness of external light is equal to or greater than a preset brightness. As described above, when the brightness of external light is equal to or greater than a preset brightness, the wearable electronic device may control the transmittance of the visor to control the intensity of the light incident on the user's iris and induce a body reaction of enlarging the user's iris.

The same descriptions of operations S502, S503, and S505 in FIG. 5(A) may be applied to those of operations S513, S514, and S515 in FIG. 5(B), respectively.

When the size of a pupil or an iris region is equal to or less than a threshold value in operation S514 of FIG. 5(B), the wearable electronic device may perform operation S512. When performing operation S512 following operation S514, the wearable electronic device may adjust the transmittance of the visor and the intensity of the light output from the display according to the size of a pupil or an iris region. That is, the wearable electronic device may adjust the transmittance of the visor and the intensity of the light output from the display according to the brightness of external light, an identified target, and the size of a pupil or an iris region.

Figure 6:
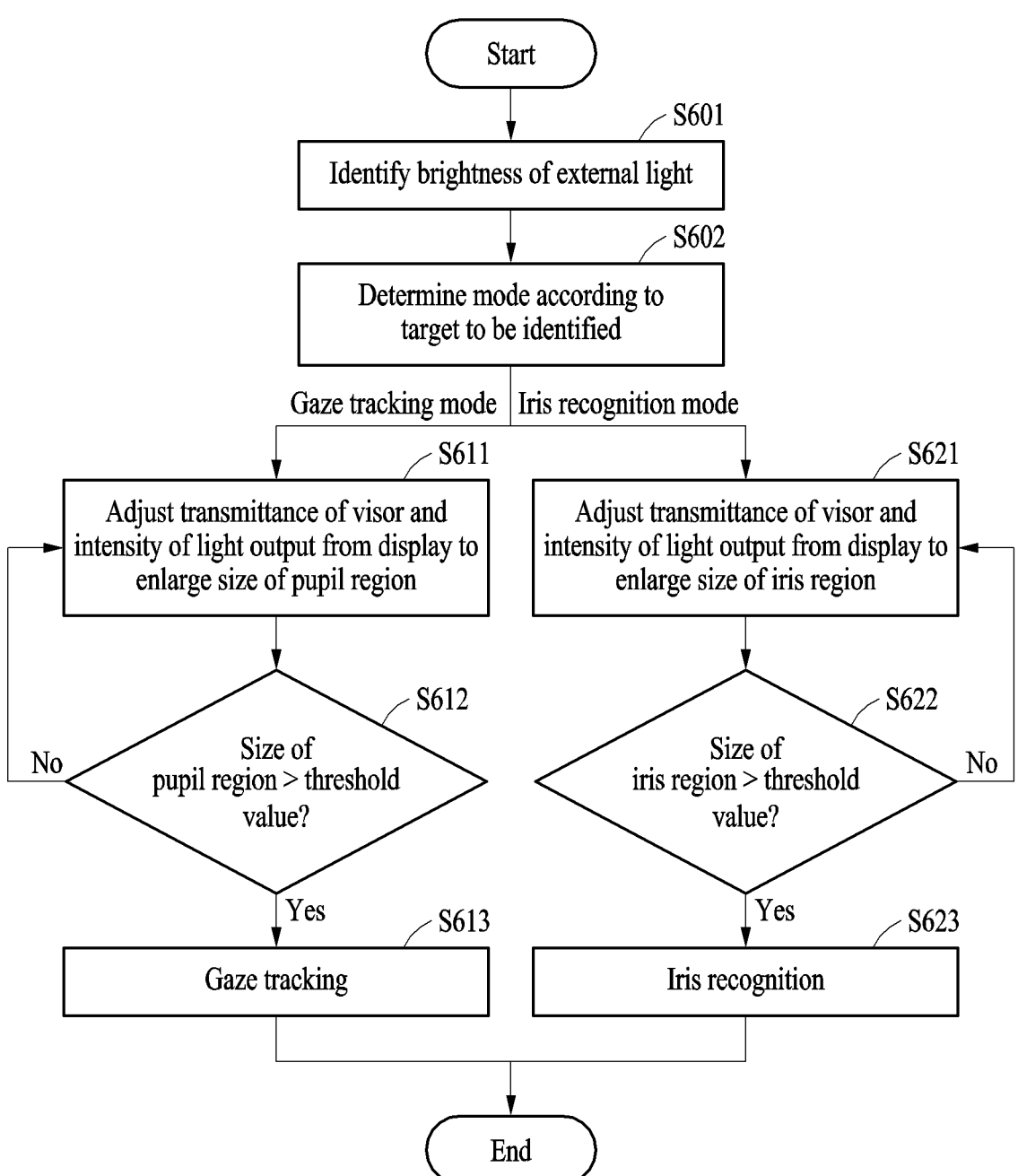
FIG. 6 is a flowchart illustrating the operation of a wearable electronic device under a mode according to various example embodiments.

FIG. 6 is a flowchart illustrating the operation of a wearable electronic device under a mode according to various example embodiments.

Referring to FIG. 6, a wearable electronic device (e.g., the electronic device 101 in FIG. 1 and the wearable electronic device 200 in FIG. 2) according to an example embodiment may include an illuminance sensor for measuring the brightness of external light.

In operation S601, the wearable electronic device may identify the brightness of the external light measured by the illuminance sensor.

In operation S602, the wearable electronic device may select a gaze tracking mode or an iris recognition mode according to an identified target of an image of the user's eyes acquired by a camera (e.g., the second cameras 275a and 275b in FIG. 2 and the camera 305 in FIG. 3). For example, when the wearable electronic device identifies the pupil region of the eye image, it may select the gaze tracking mode. When the wearable electronic device identifies the iris region of the eye image, it may select the iris recognition mode.

For example, when an application requiring security, such as a payment application, is executed, the wearable electronic device may select the iris recognition mode. For example, when a payment application is executed in the wearable electronic device and the user is to make a payment, the electronic device may select the iris recognition mode to recognize the iris from the eye image.

As another example, the wearable electronic device may select the iris recognition mode for user authentication to set up and/or control the wearable electronic device and an application executed in the wearable electronic device and may recognize the user's iris.

The wearable electronic device according to various example embodiments may be connected to an external electronic device (e.g., the electronic device 102 in FIG. 1). The wearable electronic device may select the iris recognition mode or the gaze tracking mode in association with the external electronic device and may recognize the user's iris or track the user's gaze direction.

For example, when a payment application is executed in the external electronic device, the wearable electronic device connected to the external electronic device may recognize the user's iris for user authentication. As another example, when the external electronic device executes an application requiring user authentication or performs an operation such as changing settings of the external electronic device and/or the wearable electronic device, the external electronic device may request the wearable electronic device connected to the external electronic device scan for the iris. For example, when the external electronic device requires that the user's iris be recognized, the wearable electronic device may scan the eye image for the user's iris.

The wearable electronic device may perform operation S611 in the gaze tracking mode. In the gaze tracking mode, the wearable electronic device may adjust the transmittance of a visor (e.g., the visors 270a and 270b in FIG. 2 and the visor 330 in FIG. 3) and the intensity of the light output from a display (e.g., the display 205 in FIG. 2) to enlarge the size of an iris region.

According to an embodiment, the wearable electronic device may determine the transmittance of the visor and the intensity of the light output from the display according to the brightness of external light in the gaze tracking mode.

In operation S612, the wearable electronic device may determine whether the size of a pupil region exceeds a preset size-threshold value.

According to an example embodiment, when the size of the pupil region identified in the gaze tracking mode is less than a preset size, the wearable electronic device may reduce the transmittance of the visor and the intensity of the light output from the display (e.g., see S611 in FIG. 6). The wearable electronic device may reduce the transmittance of the visor and the intensity of the light output from the display, thereby reducing the intensity of the light reaching the user's eyes. A decrease in the intensity of the light reaching the eye may induce the change of expanding the pupil region of the user's eye.

When the size of the pupil region exceeds a preset size threshold(e.g, see S612 in FIG. 6), the wearable electronic device may track a gaze direction of the user from the pupil region of the eye image (e.g., see S613 in FIG. 6).

The wearable electronic device may perform operation S621 in the iris recognition mode. The wearable electronic device may adjust the transmittance of the visor and the intensity of the light output from the display to increase the size of an iris region in the iris recognition mode.

According to an embodiment, the wearable electronic device may determine the transmittance of the visor and the intensity of the light output from the display according to the brightness of external light in the iris recognition mode.

In operation S622, the wearable electronic device may determine whether the size of an iris region exceeds a preset size threshold.

According to an embodiment, when the size of the iris region identified in the iris recognition mode is less than a preset size, the wearable electronic device may increase the transmittance of the visor and the intensity of the light output from the display. The wearable electronic device may increase the transmittance of the visor and the intensity of the light output from the display, thereby raising the intensity of the light reaching the user's eyes. An increase in the intensity of the light reaching the eye may induce the change of expanding the iris region of the user's eye.

When the size of an iris region exceeds a preset size threshold, the wearable electronic device may recognize the user's iris from an iris region in the eye image in operation S623.

As described above, the wearable electronic device may select the gaze tracking mode or the iris recognition mode according to an identified target. The wearable electronic device may determine the transmittance of the visor and the intensity of the light output from the display differently according to a mode as in operations S611 and S612 described herein.

Figure 7:
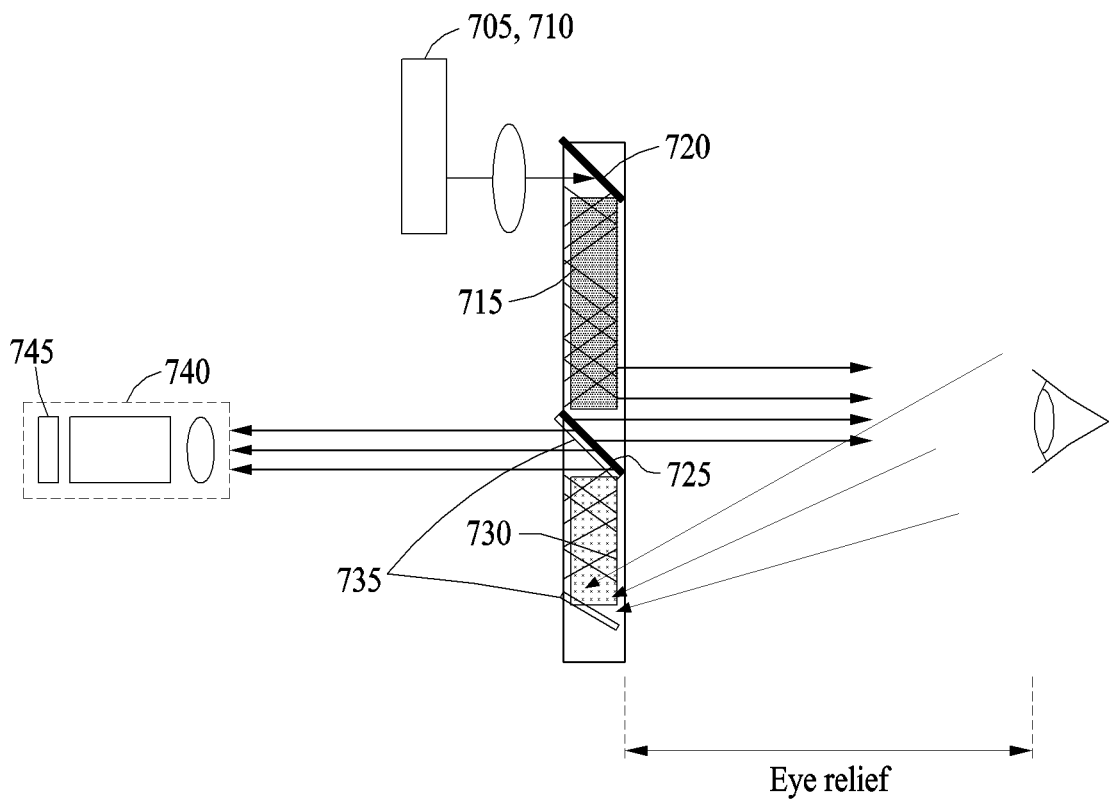
FIG. 7 is a diagram illustrating a camera and a gaze tracking sensor according to an exemplary embodiment.

FIG. 7 is a diagram illustrating a camera and a gaze tracking sensor according to an exemplary embodiment.

Referring to FIG. 7, a wearable electronic device (e.g., the electronic device 101 in FIG. 1 and the wearable electronic device 200 in FIG. 2) according to an embodiment may include displays 705 and 710 (e.g., the displays 205 and 210 in FIG. 2 and the display 340 in FIG. 3), an optical waveguide (or a waveguide) 715, an input optical member 720 (e.g., the input optical member 220 in FIG. 2), an output optical member 725, an eye tracking (ET) optical waveguide (or ET waveguide) 730, an ET splitter 735, a camera 740 (e.g., the second cameras 275a and 275b and the camera 305 in FIG. 3), a gaze tracking sensor 745 and a lighting unit (e.g., the lighting units 230a and 230b in FIG. 2).

Referring to FIG. 7, the light output from the displays 705 and 710 of the wearable electronic device enters the input optical member 720, passes through the optical waveguide 715 and is transmitted to the user's eyes from the output optical member 725.

Referring to FIG. 7, the camera 740 may capture an image of the user's eyes. For example, the eye image may enter the lower ET splitter 735 and be transmitted to the upper ET splitter 735 via the ET optical waveguide 730. The camera 740 may capture the eye image from the upper ET splitter 735.

The lighting unit according to an example embodiment may output infrared light to the user's pupil region. The infrared light may be reflected from the user's pupil and transmitted to the ET splitter 735 together with the eye image. The eye image captured by the camera 740 may include reflected infrared light. The gaze tracking sensor 745 may detect the infrared light reflected from the user's pupil.

In an example embodiment, the gaze tracking sensor 745 may use the infrared light reflected from the user's pupil.

A processor of the wearable electronic device (e.g., the processor 120 in FIG. 1 and the processor 300 in FIG. 3) may track the user's gaze direction using the infrared light reflected from the eye image.

Figure 8:
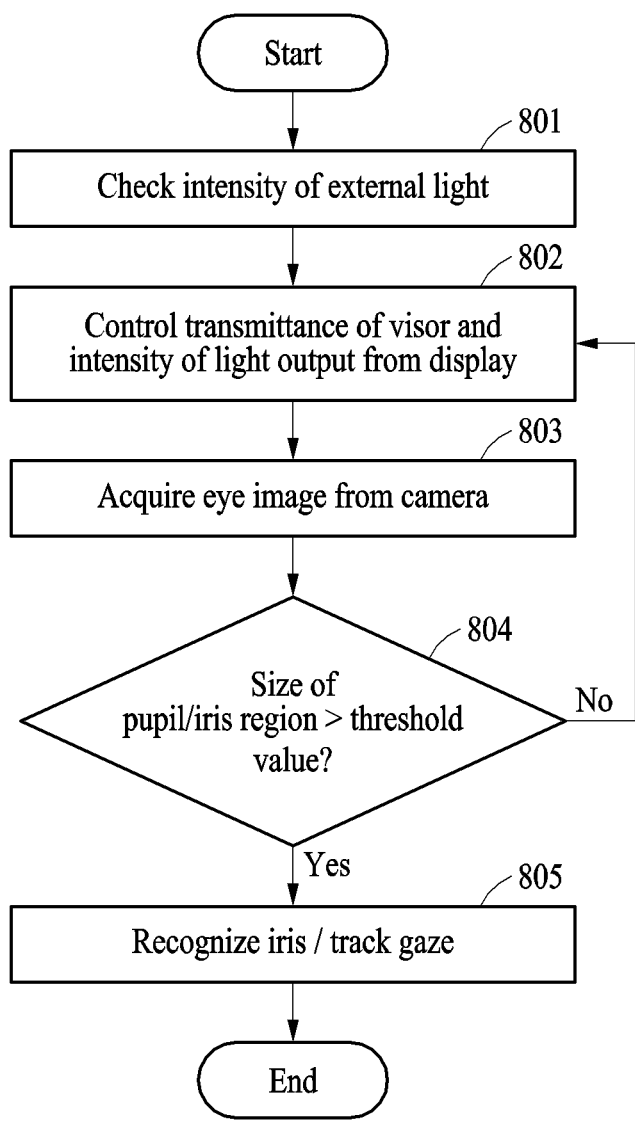
FIG. 8 is a flowchart illustrating the gaze tracking and iris recognition of a wearable electronic device according to an example embodiment.

FIG. 8 is a diagram illustrating the gaze tracking and iris recognition of a wearable electronic device (e.g., the electronic device 101 in FIG. 1 and the wearable electronic device 200 in FIG. 2) according to various example embodiments.

Referring to FIG. 8, the wearable electronic device according to various example embodiments may sense external illuminance in operation 801. For example, an illuminance sensor of the wearable electronic device may sense external illuminance, and a processor of the wearable electronic device (e.g., the processor 120 in FIG. 1) may identify the external illuminance sensed by the illuminance sensor.

In operation 802, the wearable electronic device according to various example embodiments may control the transmittance of a visor (e.g., the visors 270a and 270b in FIG. 2 and the visor 330 in FIG. 3) and the intensity of the light output from a display (e.g., the displays 205 and 210 in FIG. 2 and the display 340).

For example, the processor may control the transmittance of the visor and the intensity of the light output from the display according to a recognized target by the wearable electronic device. For example, when the wearable electronic device is to track the user's gaze direction, the processor may control the transmittance of the visor and the intensity of the light output from the display to reduce the intensity of the light incident on the user's eyes.

For example, the processor may determine the transmittance of the visor and the intensity of the light output from the display based on external illuminance For example, when the gaze direction of the user is tracked under high external illuminance, the processor may lower the transmittance of the visor and the intensity of the light output from the display. As another example, when the user's gaze direction is tracked under low external illumination, the processor may lower or maintain the transmittance of the visor and reduce the intensity of the light output from the display.

As another example, when the wearable electronic device is to recognize the user's iris, the processor may control the transmittance of the visor and the intensity of the light output from the display to increase the intensity of light incident on the user's eyes.

For example, the processor may determine the transmittance of the visor and the intensity of the light output from the display, based on external illuminance For example, when the user's iris is recognized under high external illumination, the processor may increase the transmittance of the visor and raise or maintain the intensity of the light output from the display. As another example, when the user's iris is recognized under low external illumination, the processor may increase the transmittance of the visor and the intensity of the light output from the display.

In operation 803, the wearable electronic device according to various example embodiments may acquire the user's eye image from a camera (e.g., the second cameras 275a and 275b in FIG. 2, the camera 305 in FIG. 3 and the camera 740 in FIG. 7).

The wearable electronic device according to various example embodiments may compare the size of the iris or pupil region identified from the user's eye image with a set threshold in operation 804. For example, the processor may determine whether a size of the identified iris region is greater than or equal to a threshold value set for the iris (e.g., see 804 in FIG. 8). For example, the processor may determine whether a size of the identified pupil region is equal to or greater than a threshold value set for the pupil (e.g., see 804 in FIG. 8).

For example, when the size of the iris or pupil region identified in operation 804 is equal to or less than a threshold value, the wearable electronic device may control the transmittance of the visor and the intensity of the light output from the display under operation 802.

For example, when the size of the iris region identified in operation 804 is equal to or less than a threshold value set for the iris, the processor may control the transmittance of the visor and the intensity of the light output from the display under operation 802.

For example, when the size of the pupil region identified in operation 804 is equal to or less than a threshold value set for the pupil, the processor may control the transmittance of the visor and the intensity of the light output from the display under operation 802.

In operation 804, when the size of the identified iris or pupil region is equal to or less than a set threshold, the wearable electronic device may control the transmittance of the visor and the intensity of the light output from the display in operation 802 to induce a body reaction of enlarging the user's iris or pupil.

The wearable electronic device according to various example embodiments may recognize the user's iris or gaze direction in operation 805 (e.g., after "Yes" in step 804).

In FIG. 8, when the size of the extracted iris or pupil region is smaller than a threshold value, the wearable electronic device controls the transmittance of the visor and the intensity of the light output from the display under operation 802. As another example, when the iris is not recognized from the user's eye image or the user's gaze direction is not tracked, the wearable electronic device may control the transmittance of the visor and the intensity of the light output from the display under operation 802.

A wearable electronic device (e.g., the electronic device 101 in FIG. 1 and the wearable electronic device 200 in FIG. 2) according to various example embodiments may include a visor (e.g., the visors 270a and 270b in FIG. 2 and the visor 330 in FIG. 3), a display that outputs the light projected on the user's eyes through an optical waveguide (e.g., the displays 205 and 210 in FIG. 2 and the display 340 in FIG. 3), a camera that captures an image of the user's eyes (e.g., the second camera 275a and 275b in FIG. 2, the camera 305 in FIG. 3, and the camera 740 in FIG. 7) and a processor (e.g., the processor 120 in FIG. 1 and the processor 300 in FIG. 3) that tracks a gaze direction of the user from the eye image and supplies a control signal to the visor and the display, wherein the processor may determine the transmittance of the visor and the intensity of the light output from the display according to the size of the pupil region identified from the eye image, and the visor may include an electrochromic element that changes color depending on applied power to adjust the transmittance.

The wearable electronic device may further include an illuminance sensor measuring the brightness of external light, and the processor may determine the transmittance of the visor and the intensity of the light output from the display according to the brightness of external light.

The processor may reduce the transmittance of the visor and the intensity of the light output from the display when the size of a pupil region is less than a preset size.

The wearable electronic device may further include a lighting unit (e.g., the lighting units 230a and 230b in FIG. 2) that outputs infrared light to a pupil region of the user and a gaze tracking sensor (e.g., the gaze tracking sensor 745 in FIG. 7) that detects reflected infrared light from the user's pupil and tracks the user's gaze direction based on the reflected light. Each lighting unit herein may include at least one light source and/or lighting circuitry.

A wearable electronic device (e.g., the electronic device 101 in FIG. 1 and the wearable electronic device 200 in FIG. 2) according to various example embodiments may include a visor (e.g., the visors 270a and 270b in FIG. 2, and the visor 330 in FIG. 3), a display (e.g., the displays 205 and 210 in FIG. 2 and the display 340 in FIG. 3) that outputs the light projected on the user's eyes through an optical waveguide, a camera (e.g., the second cameras 275a and 275b in FIG. 2, the camera 305 in FIG. 3, and the camera 740 in FIG. 7) that acquires an image of the user's eyes and a processor (e.g., the processor 120 in FIG. 1 and the processor 300 in FIG. 3) that recognizes the user's iris from the eye image and supplies a control signal to the visor and the display, wherein the processor may determine the transmittance of the visor and the intensity of the light output from the display according to the iris region identified from the eye image and the visor may include an electrochromic element which changes color depending on applied power to adjust the transmittance.

The wearable electronic device may further include an illuminance sensor measuring the brightness of external light, and the processor may determine the transmittance of the visor and the intensity of the light output from the display according to the brightness of external light.

The processor may increase the transmittance of the visor when the brightness of external light is equal to or greater than a preset brightness.

When the size of the iris region is less than a preset size, the processor may increase the transmittance of the visor and the intensity of the light output from the display.

A wearable electronic device (e.g., the electronic device 101 in FIG. 1 and the wearable electronic device 200 in FIG. 2) according to various example embodiments may include a visor (e.g., the visors 270a and 270b in FIG. 2 and the visor 330 in FIG. 3), a display (e.g., the displays 205 and 210 in FIG. 2 and the display 340 in FIG. 3) that outputs the light projected on the user's eyes through an optical waveguide, a camera (e.g., the second cameras 275a and 275b in FIG. 2, the camera 305 in FIG. 3, and the camera 740 in FIG. 7) that acquires an image of the user's eyes, and a processor (e.g., the processor 120 in FIG. 1 and the processor 300 in FIG. 3) that supplies a control signal to the visor and the display, wherein the processor may select an iris recognition mode or a gaze tracking mode according to an identified target from the eye image, and determine the transmittance of the visor and the intensity of the light output from the display according to a size of the target to be identified from the eye image, and the visor may include an electrochromic element which changes color to adjust the transmittance.

The processor may increase the transmittance of the visor and the intensity of the light output from the display when the size of an iris identified in an iris recognition mode is less than a preset size.

The wearable electronic device may further include an illuminance sensor measuring the brightness of external light. The processor may increase the transmittance of the visor when the brightness of external light exceeds a preset brightness in the iris recognition mode, and the processor may increase the intensity of the light output from the display when the brightness of external light is less than or equal to a preset brightness in the iris recognition mode.

The processor may reduce the transmittance of the visor and the intensity of the light output from the display when the size of the pupil identified in the gaze tracking mode is less than a preset size.

The wearable electronic device may further include an illuminance sensor measuring the brightness of external light, and the processor may determine the transmittance of the visor and the intensity of the light output from the display according to the brightness of external light in the gaze tracking mode.

The wearable electronic device may further include a lighting unit (e.g., the lighting units 230a and 230b in FIG. 2), including at least one light source, that outputs infrared light to the user's pupil region and a gaze tracking sensor (the gaze tracking sensor 745 in FIG. 7) that detects reflected infrared light from the user's pupil and tracks the user's gaze.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be understood that various example embodiments of the present disclosure and the terms used therein are not intended to limit the technological features set forth herein to particular example embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., in a wired manner), wirelessly, or via at least a third element.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-predetermined integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wearable electronic device, comprising:
   a visor configured to adjust an amount of external light entering a user's eyes according to transmittance of the visor;
   a display configured to output light projected on the user's eyes through at least an optical waveguide;
   a camera configured to capture an image of the user's eyes;
   an illuminance sensor configured to measure brightness of the external light;
   at least one processor including processing circuitry;
   memory storing instructions that, when executed by the at least one processor, cause the wearable electronic device to:
   identify a size of an iris region of user based on a first image of at least one of the user's eyes captured from the camera,
   determine whether the size of an iris region identified in the first image exceeds a threshold value:

based on the size of the iris region being determined to be less than or equal to the threshold value, adjust the visor to increase the amount of the external light entering the user's eyes by increasing the transmittance of the visor and/or the display—to increase the light projected on the user's eyes by increasing the intensity of the light output from the display, to induce a response in which the iris region enlarges, obtain a second image of at least one of the user's eyes including the enlarged iris region induced by the adjusted visor and/or the adjusted display, and recognize the user's iris based on whether the size of the enlarged iris region included in the second image exceeds the threshold value, wherein the visor comprises an electrochromic element configured to adjust the transmittance depending on applied power.

2. The wearable electronic device of claim 1, wherein the instructions that, when executed by the at least one processor, cause the wearable electronic device to:

increase the transmittance of the visor when the brightness of the external light is greater than or equivalent to a preset brightness.

3. The wearable electronic device of claim 1, wherein the instructions that, when executed by the at least one processor, cause the wearable electronic device to:

provide, to the visor and the display, control signals to increase the transmittance of the visor and increase the intensity of the light output from the display when the size of the iris region is less than the threshold value.

4. The wearable electronic device of claim 1, wherein the instructions that, when executed by the at least one processor, cause the wearable electronic device to: provide control signals to increase the transmittance of the visor and to increase the intensity of light output from the display, based on the user's iris not being recognized in the image.

5. A wearable electronic device, comprising:

a visor configured to adjust an amount of external light entering a user's eyes according to a transmittance of the visor;

a display configured to output the light that is projected on the user's eyes through at least an optical waveguide;

a camera configured to capture an image of the user's eyes;

memory storing instructions that, when executed by a processor, cause the wearable electronic device to:

select an iris recognition mode and/or a gaze tracking mode, identify a size of an iris region of at least one of a user's iris or a user's gaze direction depending on selected mode based on a first image of at least one of the user's eyes captured from the camera, and based on the iris recognition mode being selected, determine whether the size of the iris region identified in the first image exceeds a threshold value, based on the size of the iris region being determined less than or equal to the threshold value, adjust the visor to increase the amount of the external light entering the user's eyes by increasing the transmittance of the visor and/or the display to increase the light projected on the user's eyes by increasing the intensity of the light output from the display, to induce a response in which the iris region enlarges, obtain a second image of at least one of the user's eyes including the enlarged iris region induced by the adjusted visor and/or the adjusted display, and recognize the user's iris based on whether the size of the enlarged iris region included in the second image exceeds the threshold value, wherein the visor comprises an electrochromic element configured to adjust the transmittance depending on applied power.

6. The wearable electronic device of claim 5, wherein the instructions that, when executed by the processor, cause the wearable electronic device to:

provide control signals to increase the transmittance of the visor and to increase the intensity of the light output from the display when the size of the iris region identified in the iris recognition mode is less than the threshold value.

7. The wearable electronic device of claim 5, further comprising:

an illuminance sensor configured to measure a brightness of the external light, wherein the instructions that, when executed by the processor, cause the wearable electronic device to:

increase the transmittance of the visor when the brightness of the external light exceeds a preset brightness in the iris recognition mode, and/or increase the intensity of the light output from the display when the brightness of the external light is equal to or less than a preset brightness.

8. The wearable electronic device of claim 5, wherein the instructions that, when executed by the processor, cause the wearable electronic device to:

provide a control signals to decrease the transmittance of the visor and to decrease the intensity of the light output from the display when the size of a pupil identified in the gaze tracking mode is less than a preset size.

9. The wearable electronic device of claim 5, further comprising:

an illuminance sensor configured to measure a brightness of the external light, wherein the instructions that, when executed by the processor, further cause the wearable electronic device to:

determine the transmittance of the visor and the intensity of light output from the display according to the brightness of the external light in the gaze tracking mode.

10. The wearable electronic device of claim 5, further comprising:

a lighting unit, comprising a light source, configured to output infrared light to a pupil region of the user; and a gaze tracking sensor configured to detect reflected infrared light from the user's pupil region and to track the user's gaze direction based on the reflected light.

11. The wearable electronic device of claim 5, wherein the instructions that, when executed by the processor, cause the wearable electronic device to: provide control signals to increase the transmittance of the visor and to increase the intensity of light output from the display, based on the user's iris not being recognized in the image.

* * * * *